United States Patent [19]
Barrus et al.

[11] Patent Number: 5,768,100
[45] Date of Patent: Jun. 16, 1998

[54] MODULAR COMPUTER HAVING CONFIGURATION-SPECIFIC PERFORMANCE CHARACTERISTICS

[75] Inventors: Jeffrey C. Barrus, Tomball; Paul M. Moore, Spring; Dean P. Perkins, Tomball, all of Tex.

[73] Assignee: Compaq Computer Corporation, Houston, Tex.

[21] Appl. No.: 609,290

[22] Filed: Mar. 1, 1996

[51] Int. Cl.⁶ .............................. G06F 1/16; H05K 7/10
[52] U.S. Cl. .............................................. 361/686
[58] Field of Search ..................... 364/708.1; 439/638; 361/686

[56] References Cited

U.S. PATENT DOCUMENTS

| | | | |
|---|---|---|---|
| 4,530,066 | 7/1985 | Ohwaki et al. | 364/708.1 |
| 4,680,674 | 7/1987 | Moore | 361/686 |
| 5,311,397 | 5/1994 | Harshberger et al. | 361/686 X |
| 5,408,382 | 4/1995 | Schultz et al. | 361/686 |
| 5,459,637 | 10/1995 | Ma et al. | 361/686 |

OTHER PUBLICATIONS

Digital Computers, Digital Hinote Line, (Date unknown), Digital Catalog, pp. 5, and 7.
Digital Computers, "The New Digital Hinote Ultra Multimedia Notebook", Jun. 19, 1995, Wall Street Journal (Advertisement), pp. 8–11.

*Primary Examiner*—Michael W. Phillips
*Attorney, Agent, or Firm*—Fish & Richardson P.C.

[57] ABSTRACT

A modular computer includes a portable computer providing a first set of performance characteristics, an expansion module couplable to the bottom surface of the portable computer to provide, in combination therewith, a second set of performance characteristics, and a docking module couplable to the portable computer through the expansion module to provide, in combination therewith, a third set of performance characteristics. A method of altering the features of a portable computer includes providing a portable computer having a first set of features, operatively coupling the portable computer to a transportable base wherein the coupling provides a second set of features, and operatively connecting the portable computer through the transportable base to a stationary base, wherein the connecting provides a third set of features.

15 Claims, 9 Drawing Sheets

MODULAR COMPUTER HAVING CONFIGURATION-SPECIFIC PERFORMANCE CHARACTERISTICS

BACKGROUND

This invention relates to a modular notebook computer.

Known notebook computers may include different components to provide users with a variety of functional and performance characteristics. Sometimes the computer has a bay able to receive modular components interchangeably, such as a disk or a battery. Sometimes the computer may be attached to a multimedia base or inserted into a docking station.

SUMMARY

In general, in one aspect, the invention features a modular computer including a portable computer module providing a first set of performance characteristics. The modular computer further includes an expansion module reversibly coupled to an exterior surface of the portable computer module to provide, in combination therewith, a second set of performance characteristics. The modular computer further includes a docking module reversibly couplable both to the portable computer module singly and to the portable computer module when combined with the expansion module to provide, in combination therewith, a third set of performance characteristics.

Implementations of the invention may include one or more of the following features. The second set of performance characteristics may include multimedia capabilities, enhanced sound production, increased memory capacity, faster computing speed, and extending battery capability. The third set of performance characteristics may include an enlarged keyboard, an enlarged monitor, a higher resolution monitor, an enlarged pointing device, an enlarged speaker, an enhanced fidelity speaker, a printer, a scanner, and network interface capabilities.

In general, in one aspect, the invention features a modular computer including a portable computer module, a multimedia module reversibly couplable to an exterior surface of the portable computer module to provide multimedia capabilities thereto, and a docking module reversibly couplable both to the portable computer module singly and to the portable computer module when combined with the multimedia module to provide desktop capabilities thereto.

Implementations of the invention may include one or more of the following features. The portable computer module may include an external disk drive, an internal disk drive, a pointing device interchangeable without tools, a battery, and a battery handle. The multimedia module may include a CD ROM drive, a speaker, a MIDI/game port and a battery. The docking module may include an alternating current (AC) power supply, a network interface card, a keyboard, a monitor, a pointing device, a printer, a scanner, a speaker, and an adaptor for reversibly adapting the docking module for coupling to the portable computer module singly or in combination with the multimedia module.

In general, in one aspect, the invention features a method of altering the features of a portable computer including providing a portable computer having a first set of features, operatively coupling the portable computer to a transportable base wherein the coupling provides a second set of features, and operatively connecting the portable computer singly or in combination with the transportable base to a stationary base, wherein the connecting provides a third set of features.

Implementations of the invention may include one or more of the following features. The second set of features may include a CD ROM drive, a speaker, a MIDI/game port and a battery. The third set of features may include a network interface card, an alternating current (AC) power supply, a keyboard, a monitor, a pointing device, a speaker, a printer, a scanner, and an adaptor for reversibly adapting the stationary base for coupling to the portable computer singly or in combination with the transportable base.

In general, in one aspect, the invention features a device for coupling a computer component with a docking station including an adaptor member, an expansion connector slot operatively coupled to the adaptor member, and an expansion connector post operatively coupled to the adaptor member. The slot and the post are electrically interconnected and configured to operatively mate a computer component and a docking station having incompatible expansion connectors.

Implementations of the invention may include one or more of the following features. The computer component may be a portable computer, an expansion base, and a portable computer coupled to an expansion base. The adaptor may be reversibly engaged with the docking station. The slot and the post may mate with an expansion connector post on the docking station and an expansion connector slot on the computer component, respectively. The computer component may include a portable computer.

In general, in one aspect, the invention features a method of coupling a computer component with a docking station, the computer component and the docking station having incompatible expansion connectors. The method includes interposing between the computer component and the docking station an adaptor, the adaptor having an expansion connector slot and an expansion connector post operatively coupled thereto, the slot and the post electrically interconnected and configured to operatively mate the computer component and the docking station via the incompatible expansion connectors.

Implementations of the invention may include one or more of the following features. The computer component may be a portable computer, an expansion base, and a portable computer coupled to an expansion base. The adaptor may be reversibly engaged with the docking station. The slot and the post may mate with an expansion connector post on the docking station and an expansion slot on the computer component, respectively. The computer component may be a portable computer.

In general, in one aspect, the invention features a modular computer including a portable computer module providing a first set of capabilities, the portable computer module having a downward facing expansion connector slot. The modular computer further includes a multimedia module reversibly couplable to an exterior surface of the portable computer module to provide multimedia capabilities thereto, the multimedia module having an upward facing expansion connector post and a rearward facing expansion connector slot, the upward facing expansion connector post engageable with the downward facing expansion connector slot of the portable computer module. The modular computer further includes a docking module reversibly couplable to the portable computer module when combined with the multimedia module to provide desktop capabilities thereto, the docking module having a forward facing expansion connector post engageable with the rearward facing expansion connector slot of the multimedia module. The modular computer further including an adaptor reversibly couplable to the docking module to adapt the docking module for coupling to the portable computer module to provide destop capabilities thereto, the adaptor having a rearward facing expansion connector slot and an upward facing expansion connector post engageable with the forward facing expansion connector post of the docking module and the downward facing expansion connector slot of the portable computer module, respectively.

Advantages that may be realized with the invention include one or more of the following. The modular computer provides users a high degree of flexibility with regard to size, weight, function, and performance characteristics. A user may configure the computer to meet his or her needs. Multiple users, having different needs, may use the same computer configured in a variety of ways. Because the docking module accepts all configurations of the modular computer, desktop capabilities can be provided in each of these configurations.

Other advantages and features will become apparent from the following description, and from the claims.

DESCRIPTION

FIGS. 1A and 1B are perspective views of a notebook computer with disk drives.

FIGS. 2A, 2B, and 2C are perspective views of a notebook computer with a battery handle.

Figure 7A:
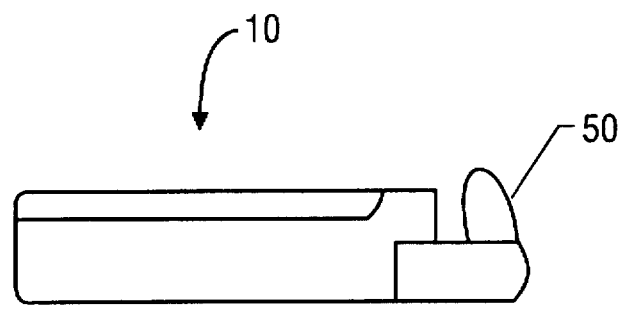
Figure 7B:
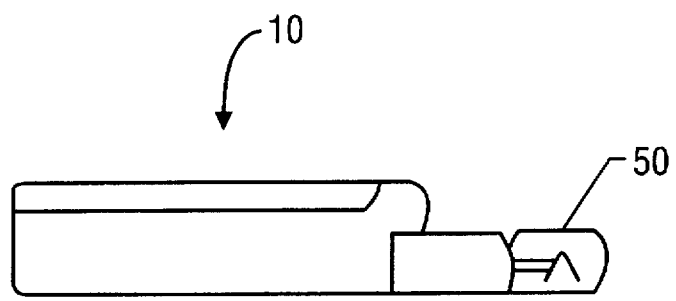
Figure 7C:
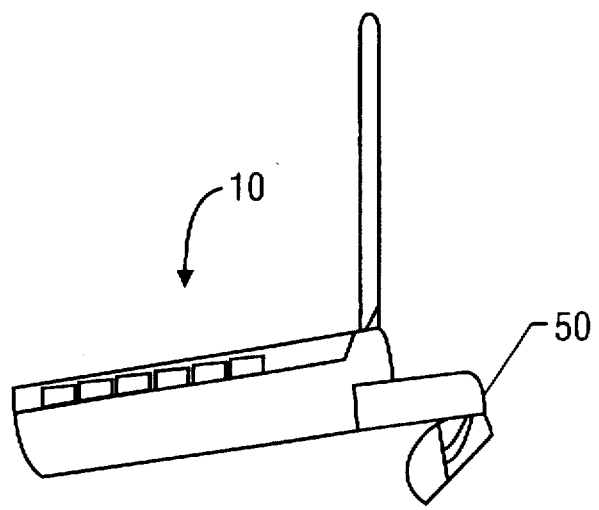

FIGS. 7A, 7B, and 7C are side views of a notebook computer with a battery handle.

Figure 1A:
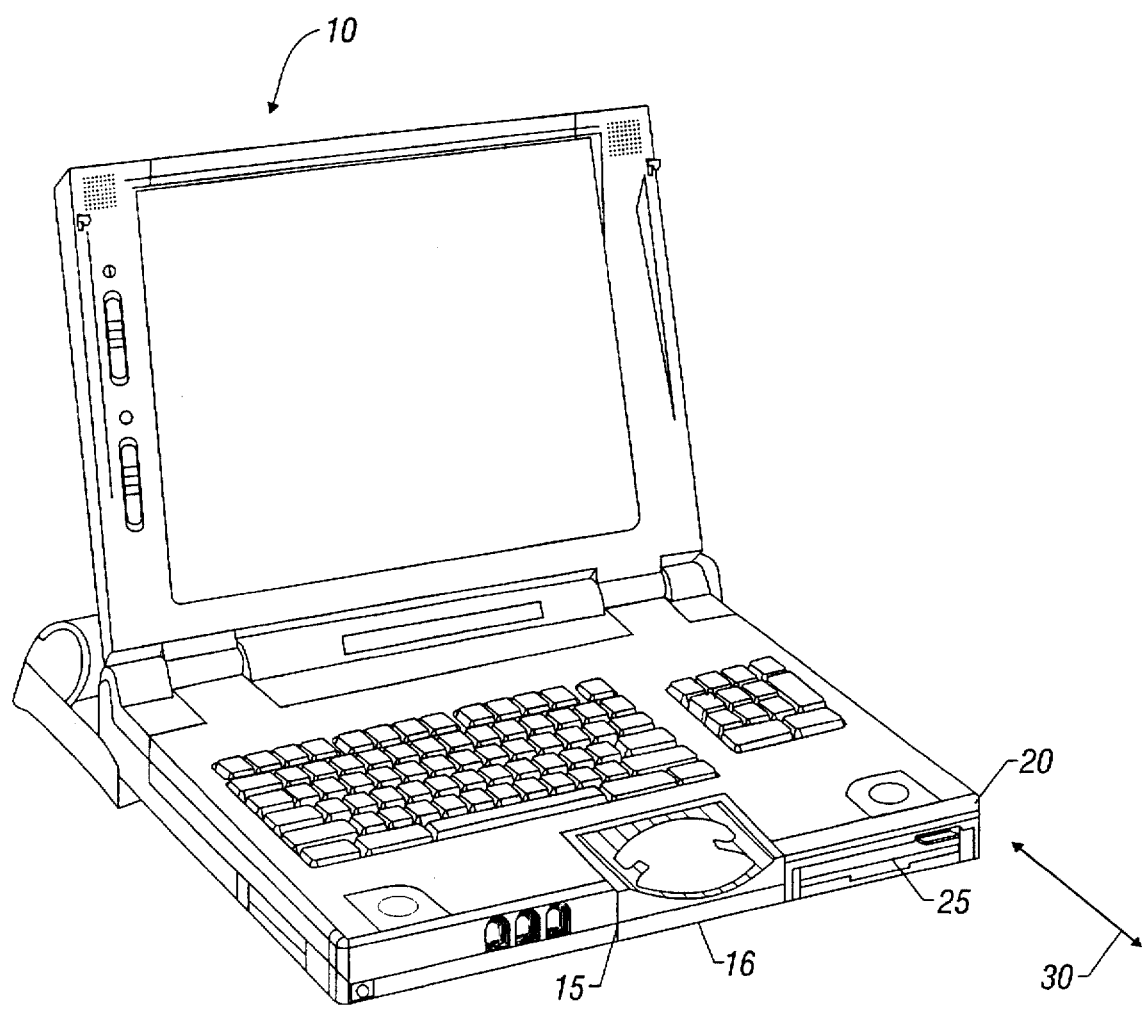
Figure 1B:
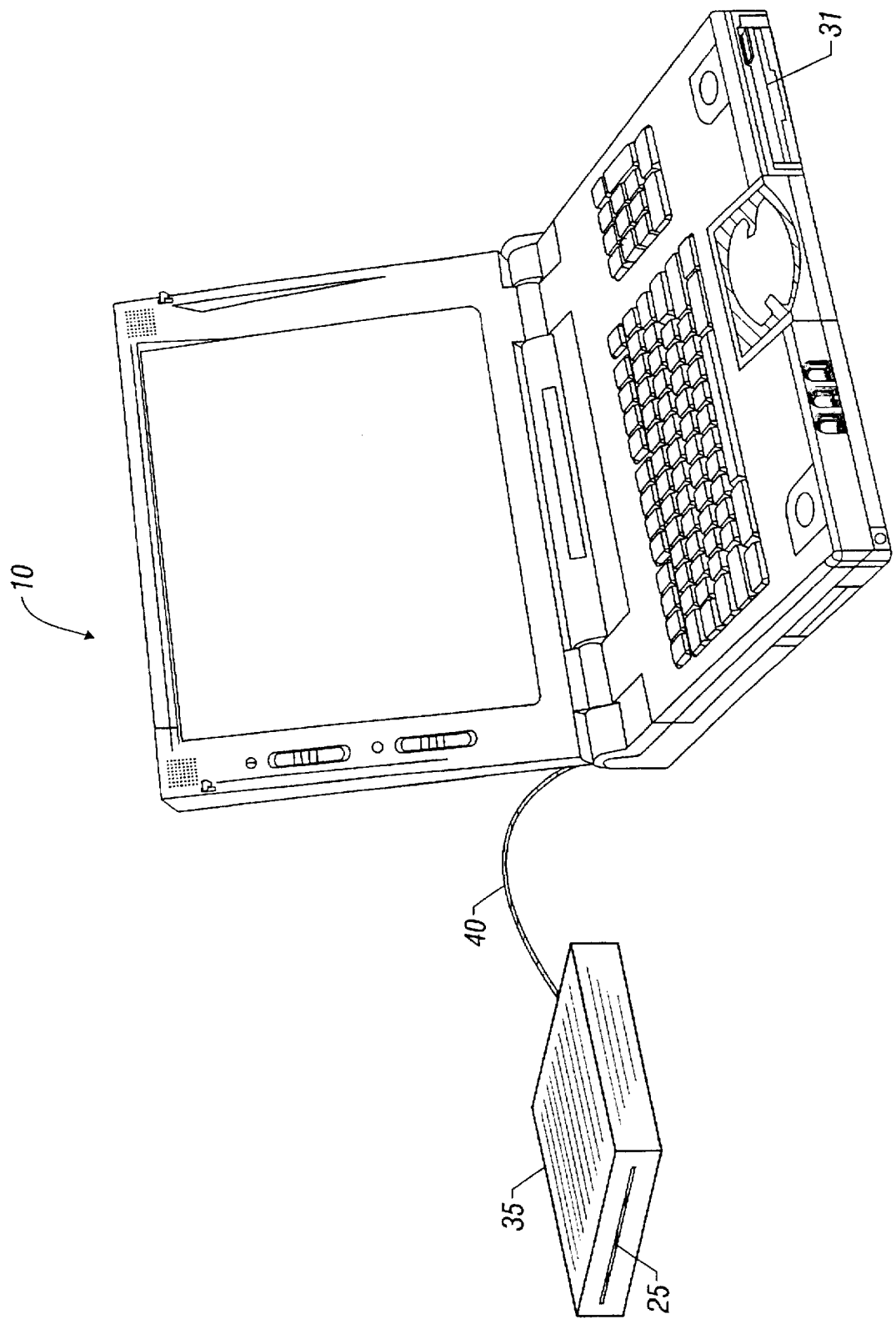

Referring to FIGS. 1A and 1B, notebook computer 10 includes pointing device bay 15 and dual bay 20. Pointing device bay 15 accepts touch pad 16 or a track ball (not shown). A pointing device may be inserted or removed from pointing device bay 15 without the use of tools. Similarly, disk drive 25 may be inserted or removed from docking bay 20 as indicated by double headed arrow 30. A battery 31 (see FIG. 1B) may be substituted for disk drive 25 in dual bay 20. Disk drive 25 may then be inserted into an external disk drive housing 35 (described in more detail in copending U.S. patent application Ser. No. 08/609,423 filed on the same day as this application and incorporated by reference herein) and connected to notebook computer 10 via cable 40.

Figure 2C:
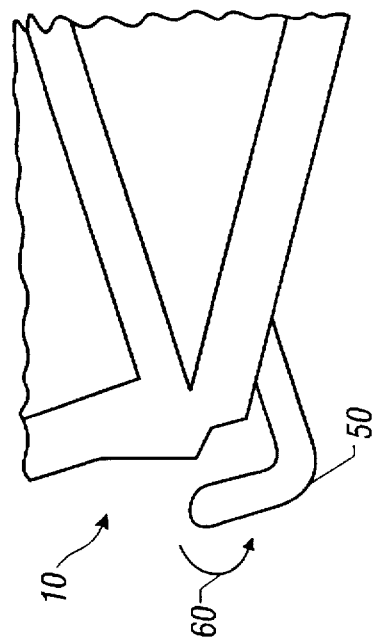
Figure 2B:
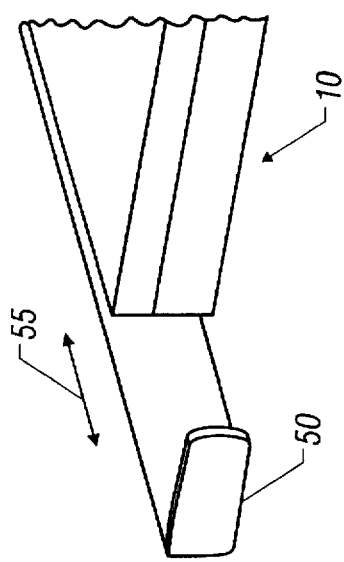
Figure 2A:
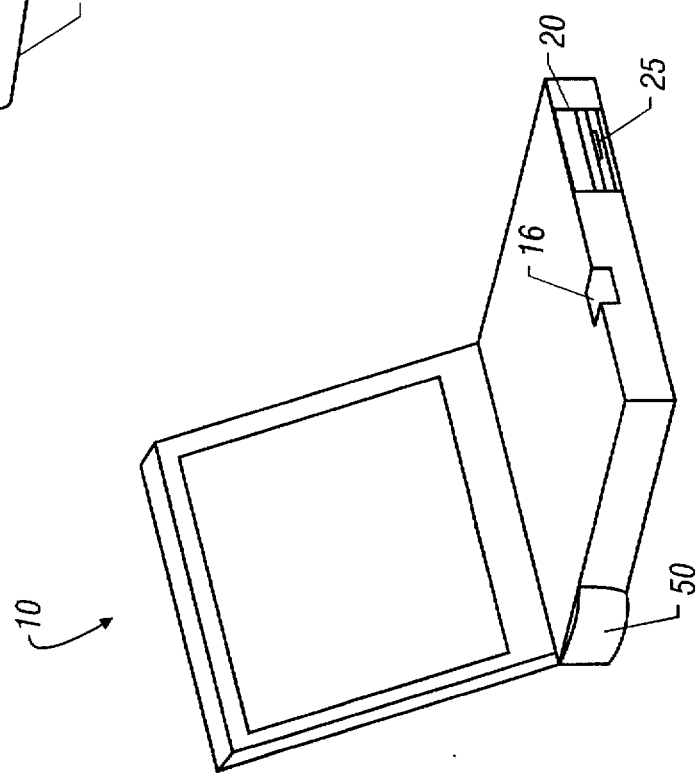

Referring to FIG. 2A, notebook computer 10 may include a battery handle 50 as described in U.S. patent application Ser. No. 08/517,382 (incorporated by reference herein). Disk drive 25 or an additional battery (not shown) may be inserted into dual bay 20. Referring to FIG. 2B, in addition to serving as a power source for notebook computer 10, battery handle 50 may be extended and retracted in the direction of arrow 55 to provide a convenient handle for carrying notebook computer 10. In addition, rotation of battery handle 50 in the direction of arrow 60 provides access to ports (not shown) on the back of notebook computer 10. When rotated into the position shown in FIG. 2C, battery handle 50 also serves as a convenient tilt foot by raising the rear of the laptop case above the supporting surface. Other aspects of the battery handle are illustrated in FIGS. 6, 7A, 7B, and 7C.

Figure 3A:
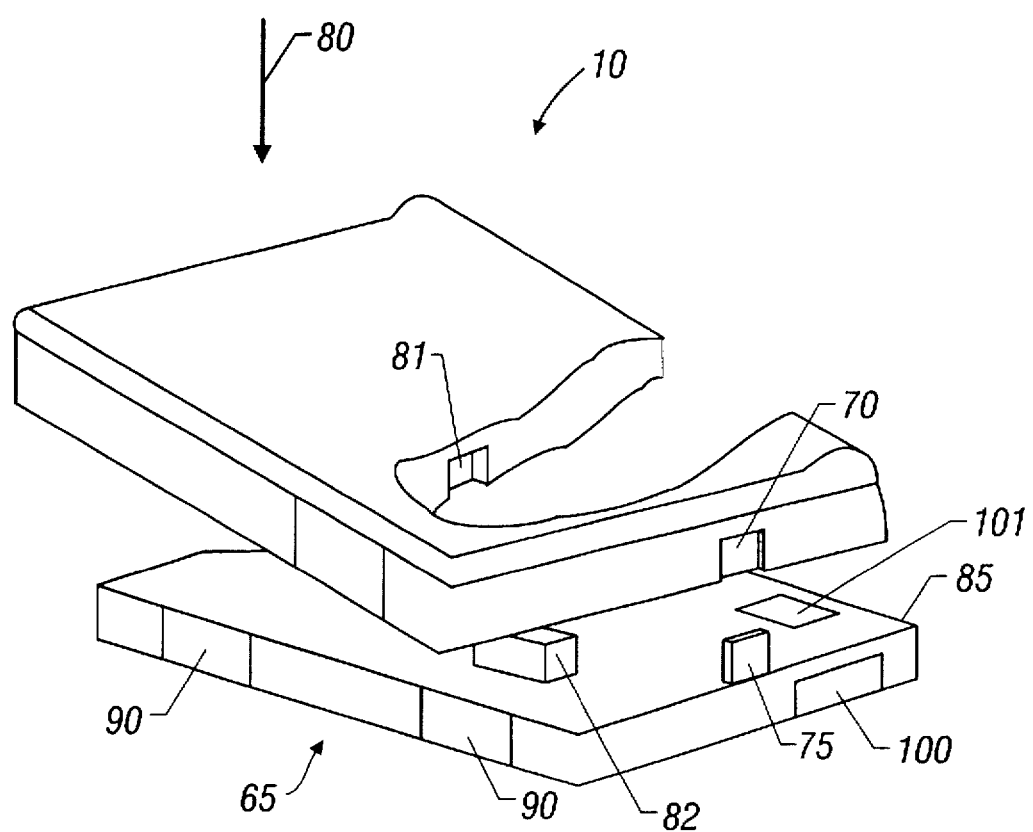
FIGS. 3A and 3B are perspective views of a notebook computer with a multimedia module.
Figure 3B:
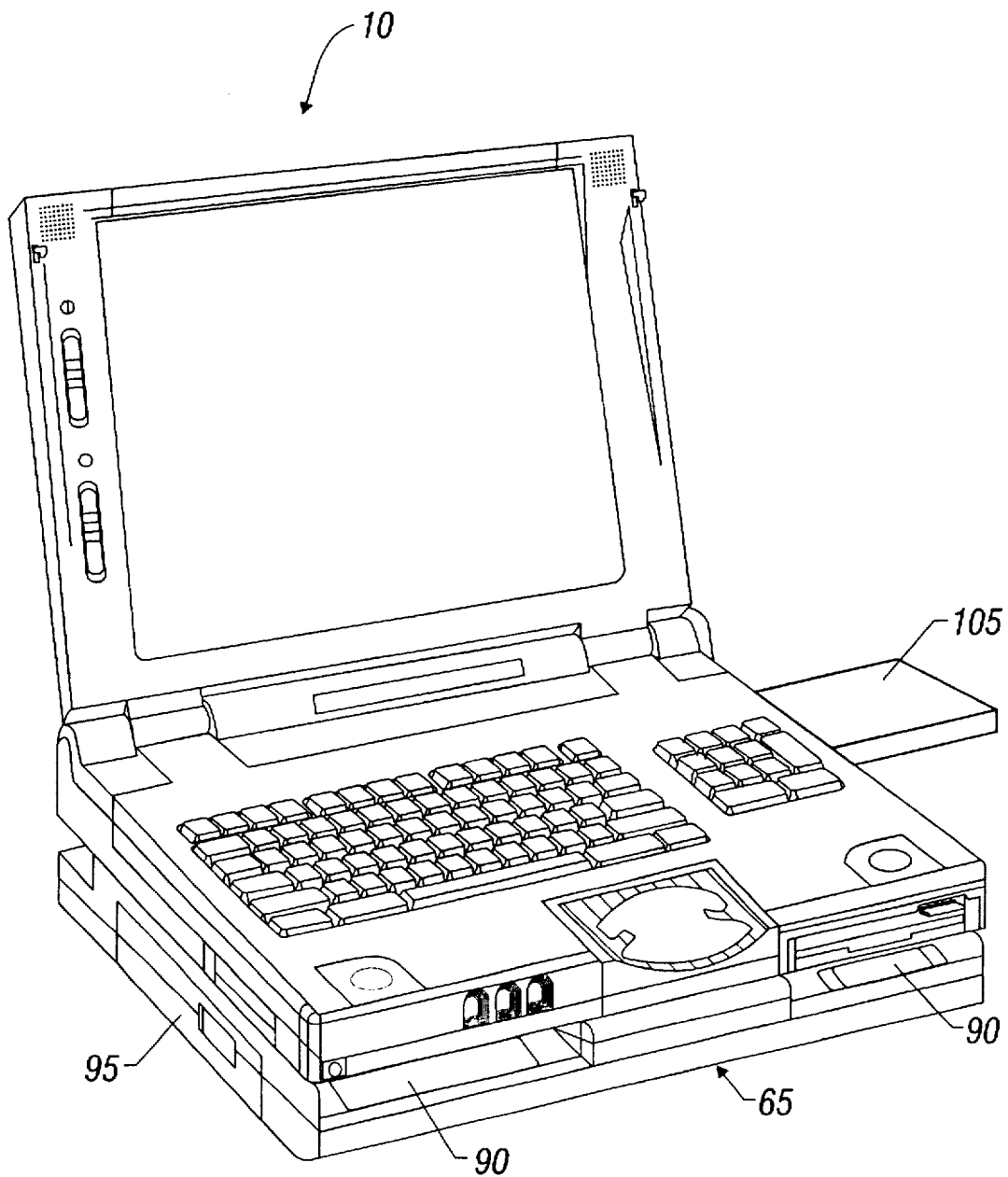

Referring to FIGS. 3A and 3B, notebook computer 10 is coupled to an expansion base in the form of a multimedia module 65. Notebook computer 10 is positioned at an angle to align a tab receptacle 70 with a tab 75 on multimedia module 65. Notebook computer 10 is then lowered in the direction of arrow 80 onto multimedia module 65 such that the expansion connector slot 81 engages the connector post 82 on upper surface 85 of multimedia module 65 to provide electrical connection therebetween. Multimedia module 65 includes speakers 90, CD ROM drive 95, battery port 100, and musical instrument digital interface (MIDI)/game port connector 101 (see FIG. 3A). Battery 105 may be inserted into battery port 100 (see FIG. 3B) to provide additional power for notebook computer 10 and multimedia module 65 in this configuration. In situations where power use is particularly heavy, notebook computer 10 and multimedia module 65 may include a battery in dual bay 20, battery handle 50, and battery 105.

In an alternative embodiment (not shown) notebook computer 10 may be coupled to an expansion base which provides features other than or in addition to those of multimedia module 65. For example, the expansion base could provide additional memory capacity or enhanced computing speed.

Figure 4:
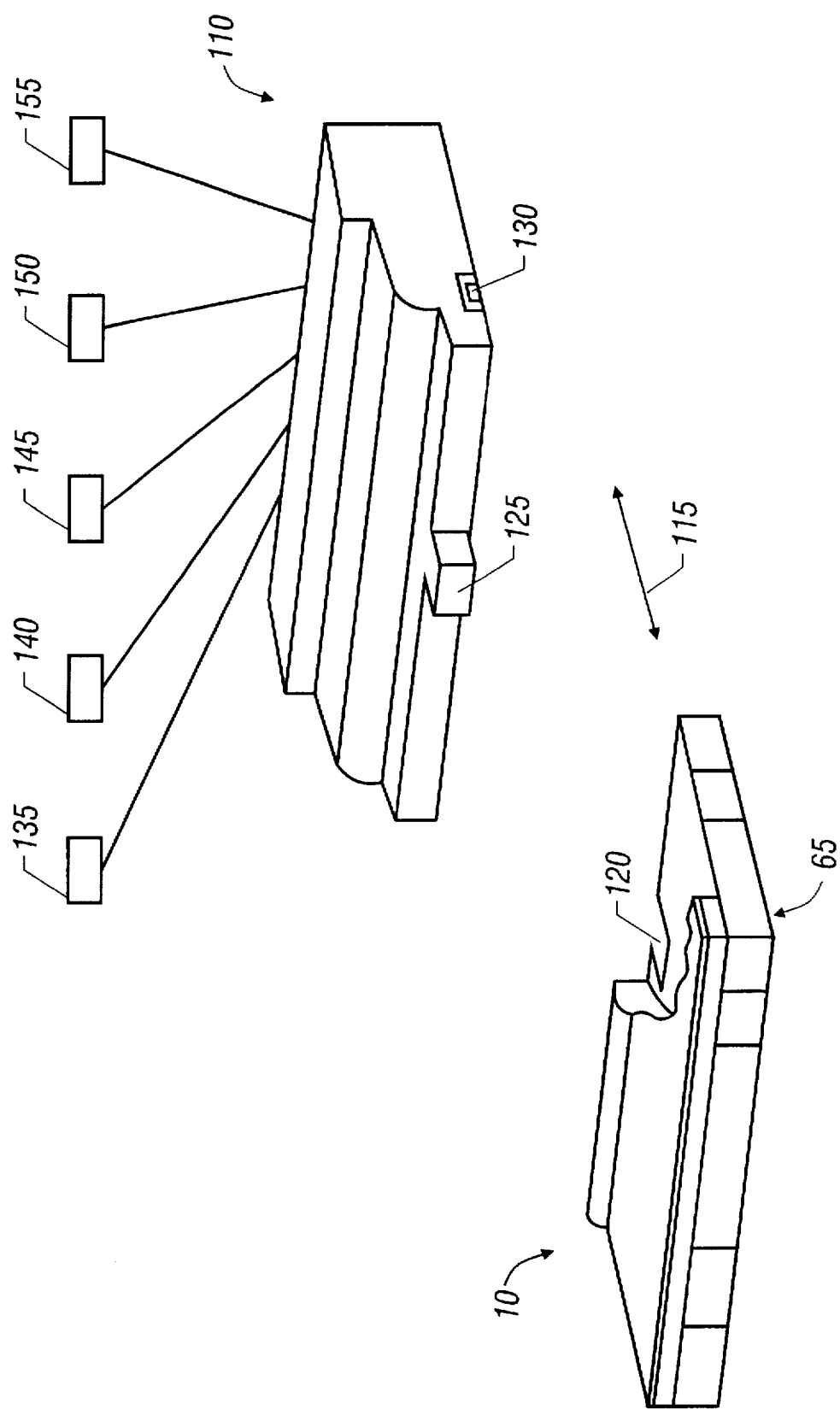
FIG. 4 is a perspective view of a notebook computer/ multimedia module combination and a docking module.

Referring to FIG. 4, notebook computer 10 coupled to multimedia module 65 is inserted into docking module 110 in the direction of arrow 115. Insertion into docking module 110 allows for engagement of expansion connector slot 120 of multimedia module 65 with expansion connector post 125. Coupling of combined notebook computer 10 and multimedia module 65 with docking module 110 is secured by sliding docking lever 130 toward the rear docking module 110. Once secured, notebook computer 10 may be used in a straight pass-through configuration to access, for example, an alternating current (AC) power supply 135, an enlarged and enhanced resolution external monitor 140, an enlarged external keyboard 145, an enlarged external pointing device 150, and other peripheral devices such as scanners, printers, and enlarged, enhanced fidelity external speakers (not shown). Alternatively, docking module 110 may include a network interface card 155 so that notebook computer 10 may have additional capacity to access a server, other computers, or the Internet. Notebook computer 10 may be disengaged by sliding docking lever 130 toward the front of docking module 110 and pulling notebook computer 10 in the direction of arrow 115.

Figure 5:
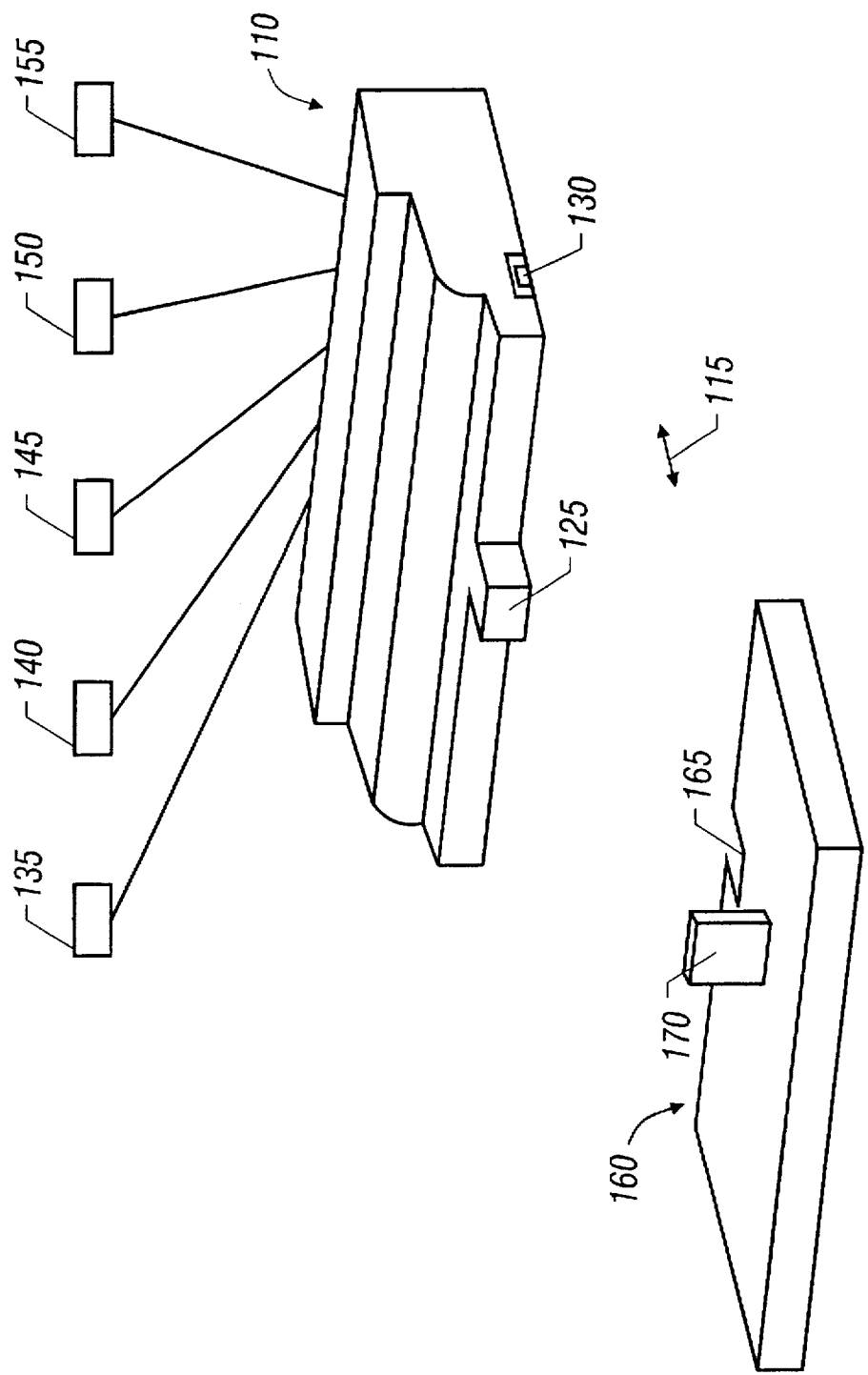
FIG. 5 is a perspective view of an adaptor and a docking module.
Figure 6:
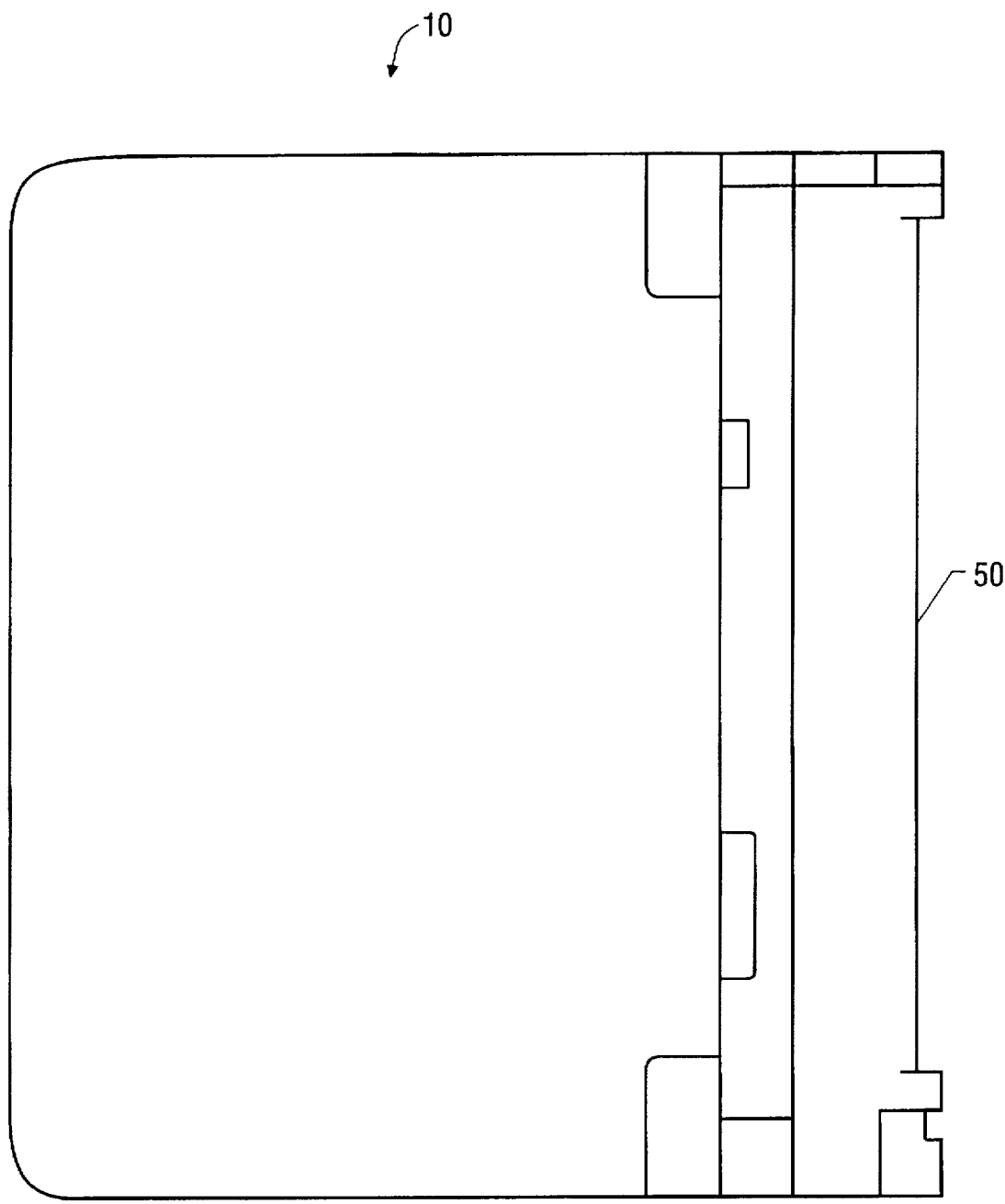
FIG. 6 is a top view of a notebook computer with a battery handle.

Referring to FIG. 5, notebook computer 10 may be coupled independently to docking module 110. However, docking module 110 is configured to accept a rearward facing expansion slot and notebook computer 10 has a downward facing expansion slot 81 (compare FIGS. 3A and 5). Therefore, docking module 110 must be coupled first to adaptor 160 so that it may engage notebook computer 10 having an incompatibly oriented expansion connector slot (see FIG. 5). Adaptor 160 is inserted in the direction of arrow 115 into docking module 110 such that connector post 125 engages expansion connector slot 165. Notebook computer 10 may then be coupled to adaptor 160 such that connector post 170 is inserted into expansion slot connector 81 of notebook computer 10. Notebook computer 10 may then be used with docking module 110 in a straight pass-through configuration or with network interface capabilities as described above.

In an alternative embodiment (not shown), a notebook computer may be coupled to a multimedia module having a downward facing expansion slot. In this configuration, the downward facing multimedia module expansion slot and the forward facing docking module expansion post are incompatibly oriented. Therefore, the docking module must be coupled first to an adaptor which provides an upward facing expansion connector post and thereby allows the docking module to engage a multimedia module having a downward facing expansion slot. Similarly, a variety of other expansion connector incompatibilities may be resolved by the use of such adaptors.

Other embodiments are within the scope of the following claims.

What is claimed is:

1. Apparatus comprising:
   a portable computer having a bottom exterior surface including a first coupling element, the portable computer providing a first set of performance characteristics;
   an expansion base having a top exterior surface including a second coupling element and a rear exterior surface including a third coupling element, said expansion base being removably couplable to the bottom exterior surface of said portable computer such that the first coupling element and the second coupling element are operatively connected to provide, in combination with the portable computer, a second set of performance characteristics; and
   a docking module removably couplable to the third coupling element of said expansion base when said portable computer is coupled to said expansion base to provide, in combination a third set of performance characteristics.

2. The apparatus of claim 1 wherein said second set of performance characteristics include at least one characteristic selected from the group consisting of multimedia capabilities, enhanced sound production, increased memory capacity, faster computing speed, and extended battery capability.

3. The apparatus of claim 1 wherein said third set of performance characteristics include at least one characteristic selected from the group consisting of an enlarged keyboard, an enlarged monitor, a higher resolution monitor, an enlarged pointing device, an enlarged speaker, an enhanced fidelity speaker, a printer, a scanner, and network interface capabilities.

4. Apparatus comprising:
   a portable computer having a bottom exterior surface including a first coupling surface;
   a multimedia module having a top exterior surface including a second coupling surface and a rear surface including a third coupling surface, said multimedia module being removably couplable to the bottom exterior surface of said portable computer such that the first coupling surface of the portable computer and the second coupling surface of the multimedia module are operatively connected, and to provide multimedia capabilities thereto; and
   a docking module removably couplable to the third coupling surface of said multimedia module when said portable computer is coupled to said multimedia module to provide desktop capabilities thereto.

5. The apparatus of claim 4 wherein said portable computer includes at least one component selected from the group consisting of an external disk drive, an internal disk drive, a pointing device interchangeable without tools, a battery, and a battery handle.

6. The apparatus of claim 4 wherein said multimedia module includes at least one component selected from the group consisting of a CD ROM drive, a speaker, a MIDI/game port, and a battery.

7. The apparatus of claim 4 wherein said docking module includes at least one component selected from the group consisting of an alternating current (AC) power supply, a network interface card, a keyboard, a monitor, a pointing device, a printer, a scanner, a speaker, and an adaptor for reversibly adapting said docking module for coupling to said portable computer module singly or in combination with said multimedia module.

8. A method of altering the features of a portable computer, comprising:
   providing a portable computer having a first set of features, the portable computer having a bottom exterior surface including a first coupling surface;
   removably coupling said portable computer to an expansion base, wherein said coupling provides a second set of features, the expansion base having a top exterior surface including a second coupling surface and a rear surface including a third coupling surface, said expansion base being removably couplable to the bottom exterior surface of said portable computer such that the first coupling surface of the portable computer and the second coupling surface of the expansion base are operatively connected; and
   removably connecting said portable computer to a docking module wherein said connecting provides a third set of features, the docking module removably couplable to the third coupling surface of said expansion base when said portable computer is coupled to said expansion base.

9. The method of claim 8 wherein said second set of features include at least one feature selected from the group consisting of a CD ROM drive, a speaker, a MIDI/game port, and a battery.

10. The method of claim 8 wherein said third set of features include at least one feature selected from the group consisting of a network interface card, an alternating current (AC) power supply, a keyboard, a monitor, a pointing device, a printer, a scanner, a speaker, and an adaptor for reversibly adapting said stationary base for coupling to said portable computer singly or in combination with said transportable base.

11. A method of coupling a portable computer with a docking station, comprising:
   interposing between a portable computer and a docking station an adaptor comprising an expansion connector slot and an expansion connector post, said slot and said post electrically interconnected and configured to operatively mate said portable computer and said docking station.

12. The method of claim 11 wherein said adaptor is removably engageable with said docking station.

13. The method of claim 12 wherein said slot and said post mate with an expansion connector post on said docking station and an expansion connector slot on said portable computer, respectively.

14. Apparatus comprising:
   a portable computer having a bottom exterior surface including a downward facing coupling surface, the portable computer providing a first set of performance characteristics;
   an expansion base having a top exterior surface including an upward facing coupling surface and a rear exterior surface including a rearward facing coupling surface, said expansion base being removably couplable to the bottom exterior surface of said portable computer such that the downward facing coupling surface of the portable computer and the upward facing coupling surface of the expansion base are operatively connected, said expansion base providing, in combination with the portable computer, a second set of performance characteristics, including at least one characteristic selected from the group consisting of multimedia capabilities, enhanced sound production, increased memory capacity, faster computer speed, and extended battery capability; and a docking module removably couplable to the rearward facing coupling surface of said expansion base when said portable computer is coupled to said expansion base to provide a third set of characteristics, including at least one characteristic selected from the group consisting of an enlarged keyboard, an enlarged monitor, a high resolution monitor, an enlarged pointing device, an enlarged speaker, an enhanced fidelity speaker, a printer, a scanner, and network interface capabilities.

15. Apparatus comprising:

a portable computer having a bottom exterior surface including a downward facing coupling surface, wherein said portable computer module includes at least one component selected from the group consisting of an external disk drive, an internal disk drive, a pointing device interchangeable without tools, a battery, and a battery handle;

a multimedia module having a top exterior surface including an upward facing coupling surface and a rear exterior surface including a rearward facing coupling surface, said multimedia module being removably couplable to the bottom exterior surface of said portable computer such that the downward facing coupling surface of the portable computer and the upward facing coupling surface of the multimedia module are operatively connected to provide multimedia capabilities thereto, wherein said multimedia module includes at least one component selected from the group consisting of a CD ROM drive, a speaker, a MIDI/game port and a battery; and a docking module removably couplable either directly to the rear coupling surface of said portable to the rearward facing coupling surface of said multimedia module when said portable computer is coupled to said multimedia module to provide desktop capabilities thereto, wherein the docking module includes at least one component selected from the group consisting of an alternating current (AC) power supply, a network interface card, a keyboard, a monitor, a pointing device, a printer, a scanner, a speaker, and an adaptor for reversibly adapting said docking module for coupling to said portable computer with said multimedia module.

* * * * *